(12) United States Patent
Lu et al.

(10) Patent No.: US 11,601,991 B2
(45) Date of Patent: Mar. 7, 2023

(54) SYSTEM AND METHOD FOR A NETWORK ACCESS SERVICE

(71) Applicant: Taiwan Semiconductor Manufacturing Company, Ltd., Hsinchu (TW)

(72) Inventors: Xuejun Lu, Ottawa (CA); Nima Ahmadvand, Ottawa (CA)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 17/311,908

(22) PCT Filed: Dec. 18, 2019

(86) PCT No.: PCT/CA2019/051844
§ 371 (c)(1),
(2) Date: Jun. 8, 2021

(87) PCT Pub. No.: WO2020/124230
PCT Pub. Date: Jun. 25, 2020

(65) Prior Publication Data
US 2021/0368555 A1    Nov. 25, 2021

Related U.S. Application Data

(60) Provisional application No. 62/781,934, filed on Dec. 19, 2018.

(51) Int. Cl.
*H04W 76/10*    (2018.01)
*H04W 12/06*    (2021.01)
(Continued)

(52) U.S. Cl.
CPC .......... *H04W 76/10* (2018.02); *H04W 12/06* (2013.01); *H04W 84/042* (2013.01); *H04W 88/16* (2013.01)

(58) Field of Classification Search
CPC ....... H04W 48/20; H04W 12/06; H04W 4/24; H04W 60/00; H04W 8/26; H04M 15/00; H04M 15/80
See application file for complete search history.

(56) References Cited

U.S. PATENT DOCUMENTS 9,661,566 B2    5/2017 Hedberg et al.
9,794,771 B2 *  10/2017 Raveendran ............ H04W 8/08
(Continued)

FOREIGN PATENT DOCUMENTS

CN    104427006 A    3/2015
EP    2194686 A1     6/2010
(Continued)

*Primary Examiner* — Khawar Iqbal
(74) *Attorney, Agent, or Firm* — JCIPRNET

(57) ABSTRACT

A network access system providing network access to a mobile terminal or other device via an untrusted access point such as a wireless access point in an untrusted network. The access point registers with a service gateway, and the wireless terminal connects with the access point and receives a first network address for use with the service gateway. The terminal registers with the service gateway via the access point, and a context identity is maintained at the service gateway, associating the terminal with the access point for the duration of the connection. The terminal can then access a wider network through the service gateway. The service gateway may maintain billing and reward data associated with the context identity.

18 Claims, 10 Drawing Sheets

(51) Int. Cl.
*H04W 84/04* (2009.01)
*H04W 88/16* (2009.01)

(56) References Cited

U.S. PATENT DOCUMENTS

| | | | |
|---|---|---|---|
| 10,299,120 B2 * | 5/2019 | Nilsson | H04W 12/06 |
| 10,764,792 B2 * | 9/2020 | Mohamed | H04W 36/0011 |
| 10,965,655 B2 * | 3/2021 | Huang | H04L 9/14 |
| 10,992,674 B2 * | 4/2021 | Van De Velde | H04L 12/2867 |
| 11,197,238 B2 * | 12/2021 | Zhu | H04W 48/16 |
| 11,323,921 B2 * | 5/2022 | Wu | H04W 76/32 |
| 2010/0040021 A1 * | 2/2010 | Aso | H04W 8/06 |
| | | | 370/331 |
| 2010/0323700 A1 | 12/2010 | Bachmann et al. | |
| 2011/0026435 A1 | 2/2011 | Weniger et al. | |
| 2016/0205064 A1 | 7/2016 | Yan et al. | |
| 2017/0078911 A1 * | 3/2017 | Jeong | H04W 76/11 |
| 2017/0195930 A1 | 7/2017 | Tomichi et al. | |
| 2017/0231020 A1 * | 8/2017 | Tomici | H04W 92/02 |
| 2019/0037459 A1 * | 1/2019 | Pelletier | H04L 5/0048 |
| 2020/0128433 A1 * | 4/2020 | Jeong | H04W 8/02 |
| 2021/0044456 A1 * | 2/2021 | Xue | H04L 12/4633 |
| 2021/0076344 A1 * | 3/2021 | Zhang | H04L 61/106 |
| 2021/0099871 A1 * | 4/2021 | Bhatnagar | H04W 12/068 |
| 2021/0153190 A1 * | 5/2021 | Wu | H04W 36/24 |

FOREIGN PATENT DOCUMENTS

| | | |
|---|---|---|
| EP | 3133871 A1 | 2/2017 |
| EP | 3038392 B1 | 8/2019 |
| JP | 2011-509615 | 3/2011 |
| JP | 2011-515900 | 5/2011 |
| WO | 2008/105176 A1 | 9/2008 |

* cited by examiner

SYSTEM AND METHOD FOR A NETWORK ACCESS SERVICE

BACKGROUND

A public land mobile network (PLMN) provides mobile telecommunications services to the public when they are moving around in a wide area (even when they move into another PLMN). User equipment (UE) accesses its subscribed services through one or more cells, which cover where the UE is currently located, and other network elements in a mobile network. Deployment of the cells in PLMNs is difficult and expensive because of: a) installation of the large number of cell towers and base stations to form the cells; and b) limited licensed spectrum resources.

In order to use more available resources for providing mobile telecommunications services defined by 3GPP (3rd Generation Partnership Project: the collaboration between groups of telecommunication standards associations), 3GPP has included solutions to enable UE to access 3GPP services via non-3GPP access networks such as WLAN, WiMAX and Fixed access network. One of such methods is based on a trusted non-3GPP access, as described in 3GPP TS 23.402 V15.3.0 section 6. For this scenario, the trusted non-3GPP access network must be fully trusted by the 3GPP network from the security view point and is involved in the authentication and authorization process between UE and 3GPP AAA (authentication, authorization, and accounting) server. However, deploying a big number of fully trusted non-3GPP access networks can also be challenging and expensive for the 3GPP network operator.

Another non-3GPP access solution is based on an untrusted non-3GPP access, as described in 3GPP TS 23.402 V15.3.0 section 7. In this case, UE can use existing mechanisms to connect to an untrusted non-3GPP network, through which UE establishes a secured tunnel with Evolved Packet Data Gateway (ePDG). The authentication and authorization process between UE and 3GPP AAA server is carried out using the secured tunnel and is not exposed to the untrusted non-3GPP network. The untrusted non-3GPP network can be one of existing access network such as a WLAN (Wireless Local Area Network) installed in a private home, a corporate site or a campus, which is not managed by the 3GPP network. However, these access networks normally belong to private owners and only grant access to a certain group of users. When UE moves out of the coverage of its designated WLAN(s), it can hardly access to other WLANs. Some WLANs provide the public with free open accesses. Security risks and lack of commercial benefit may discourage a wider deployment of such access networks. Some commercial sites such as hotels and restaurants may provide WLAN access to authorized customers, but the customers may need to provide their credentials to each of the WLAN owners. This is inconvenient.

Furthermore, the non-3GPP access solutions defined by 3GPP rely on information provided by a 3GPP cellular network to enable discovery of a non-3GPP access network. Therefore, the terminal must be a dual or multi-mode UE that at least has a subscription with a cellular network.

TECHNICAL PROBLEM TO BE SOLVED

Nowadays, there are tremendous WLANs installed in private homes, offices, commercial building and campuses. Those WLANs are not fully used during certain periods. For example, a WLAN in a home may not have much traffic during the day time, while a WLAN in an office may only have very low traffic during the night time. There will be many benefits if the spare resources of these WLANs can be contributed to the public for accessing communication services: first, public users will have more convenient network access even when they roam out of their designated access networks; second, operators/service providers can reduce their deployment cost by reuse the radio resources from these WLANs instead of installing their own radio access nodes; third, radio interferences can be reduced by resource reusing and network planning can be easier.

However, this scenario is prevented from being realized due to security risks and lack of commercial benefit for the contributor of the private WLANs. Therefore, the purpose of this invention is to provide a technical solution to enable a user of a wireless station to gain (and pay for) convenient network access using an untrusted access network (e.g. a visited WLAN) other than a trusted access network (e.g. a designated/home WLAN), and at the meantime, to avoid introducing big security risks to both the visiting UE and the visited access network, as well as to enable contributors of the untrusted access network (e.g. visited WLAN) to get some rewards for offering access resources for public use.

It is also desirable if the wireless station does not necessarily need a subscription with a cellular network operator for accessing a visited WLAN. In other words, it is advantageous if a wireless station without a cellular communication capability is enabled to use a network service such as an Internet service through a variety of visited WLANs when it roams out of its home WLAN.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
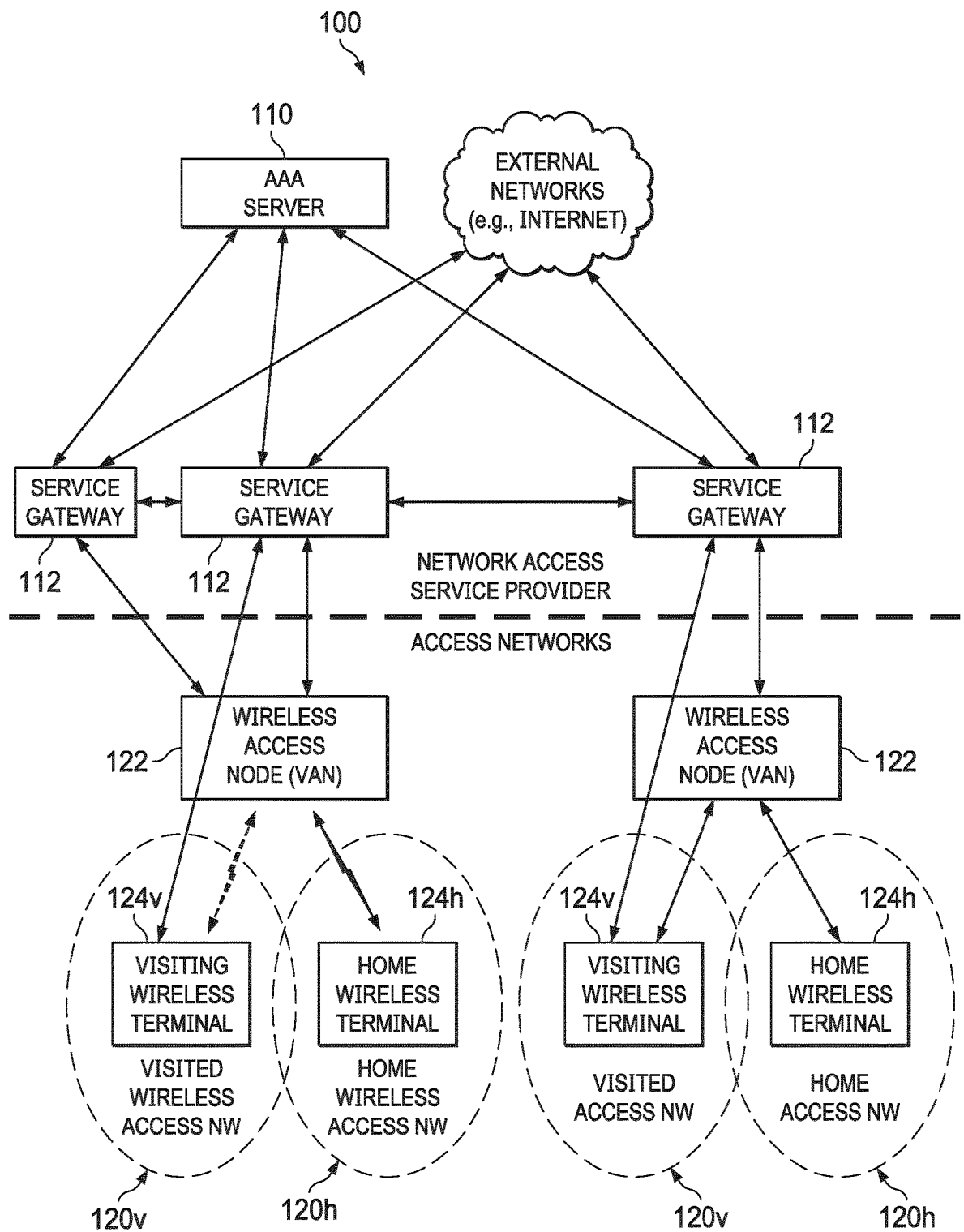
FIG. 1 illustrates network architecture for a network access service according to the invention.

The invention is based on an idea that a network access service provider incorporates a plurality of access network contributors to offer an efficient network access service to public users using wireless or wireline terminals. A significant feature of the invention is that, the network access service provider (e.g. a cellular network operator, an ISP or an organization) can make use of a plurality of access networks that are provided by itself and/or other operators/ISPs, without the need to have an agreement with the other operators/ISPs. It is the owners of the access networks, i.e. the access network contributors, that place agreements with the other operators/ISPs for using the access networks and decide whether they would like to contribute the access network resources to the network access service. Especially, the network access service can be provided independently from a cellular network. The network access service provider can be an Internet Service Provider or a cellular network operator, which introduce the enhancements into their existing network elements as the servers and gateways according to the invention. The network access service provider can also be an organization that implements new servers and gateways according to the invention. As shown in FIG. 1, in a network access service provider's network there are one or more servers for maintaining authentication, authorization and accounting (AAA) information for the network access service. The one or more AAA servers maintain information related to users subscribed for the network access service, as well as information related to access network contributors subscribed to offer access network to the subscribed users. Furthermore, in the network access service provider's network, there are one or more service gateways (SGWs), which communicate with the one or more AAA servers through secured communications for authentication, authorization and accounting procedures. The AAA servers and the SGWs are provided by the network access service provider and should maintain a trust relationship with each other using security mechanisms known in the art (such as those used in the core network of a mobile network or a fixed network). To ensure the confidential information maintained in the AAA servers, an AAA server is accessible by only the network entities provided by the network access service provider, such as other AAA servers, the SGWs and charging/billing functions within the network access service provider's network.

It should be noted that each of the SGWs or the AAA servers can be implemented as a single network entity that provides the functions as described in this invention, or it can be implemented as several network entities that provide the functions as described in this invention in a collaborative way. The SGWs or the AAA servers can further be implemented in a pool structure so as to provide enhanced load balancing and backup performance.

The access network in FIG. 1 can be a wireless access network such as a Wireless Local Area Network (WLAN), a Mobile hotspot or a femtocell. It can also be a wireline access network such as a home/corporate Ethernet based network. The access networks may be owned privately, by corporations, or universities, etc., who have agreements with the other operators/ISPs for using the access networks. Since the access networks may not be owned by the network access service provider, each of the access networks should be subscribed with the AAA servers as an access network contributor and has its permanent identity/account with associated security credentials maintained in the AAA server for participating in the service and receiving rewards for contributing access networks to the subscribed users. The permanent identity/account of an access network is used to uniquely identify a visited access node (VAN) of the access network in the network access service.

A visited access node (VAN) providing an access network can register with one or more SGWs to provide network access service to visiting users, when the access network is going to offer part or all of its network resources for the network access service. A registered VAN for the network access service can de-register from its SGWs, when it decides to stop providing network access to the users of the network access service. Therefore, the relationship between the VANs and the SGWs are generally dynamic. Once registered, the VAN should maintain secured communications with the one or more SGWs with which it has registered. Since the VANs are not deployed in sites that can be secured by the network access service provider, the VANs cannot be fully trusted by the network access service provider. Therefore, it is preferred that only a limited set of SGWs are accessible by each of the VANs. This can prevent the overall architecture of the network access service provider's network being exposed to external entities.

When a user uses a wireless or wireline terminal to access networks such as Internet through a home access network, with which the wireless or wireline terminal has a trusted relationship, the wireless or wireline terminal acts as a home wireless or wireline terminal, which behaves according to procedures as used in existing home networks (e.g. WLAN procedures and Ethernet procedures). The wireless or wireline terminal could be one or a combination of a WLAN station and an Ethernet terminal. The wireless or wireline terminal can subscribe for the network access service as a visiting wireless or wireline terminal (named VT in the description) and thereby have subscription data (e.g. a permanent VT identity/account with associated security credentials) maintained in the AAA servers. The permanent VT identity/account is used to uniquely identify the VT in the network access service. When the wireless or wireline terminal cannot connect to its home access network (e.g. in a roaming scenario) and therefore tries to seek network access from one of the other access networks offering the network access service (in other words, VANs), it acts as a visiting terminal (VT), which follows procedures according to the invention.

Before the procedures are proposed, some requirements for the network access service should be considered. In a scenario of network access service, the relationship between a VT and a VAN might be considered as an ad hoc, and it is hard to ensure a secured association between them. To reduce security risks, the permanent identity of a VT (VT ID) and its associated security credentials should not be exposed to a VAN, and the permanent identity of a VAN (VAN ID) and its associated security credentials should not be exposed to a VT. In addition, the traffic to/from the VT passing through the VAN should not be visible to the VAN. On the other hand, a VAN normally acts as a "part-time" access network contributor for the network access service, which may provide network access to its home UEs at the same time. Therefore, it is desired to avoid exposing the security credentials and traffic in the home access network provided by the VAN to any of the VTs. The following procedures are defined to meet the requirements.

A VAN can decide whether to start offering the network access service based on a preconfigured schedule. Alternatively, it can decide to start offering the network access service based on status information collected from the existing home access network. For example, a VAN may monitor the traffic status in the home access network. The traffic may include wireless and/or wireline traffic. If the monitored traffic in the home access network is low and therefore there are spare resources for the network access service, the access node may decide to configure a network section to provide the network access service to VTs.

To avoid exposing the existing home access network to the VTs, it is preferred for the access node to configure a separate network section for providing the network access service. The separate network section uses security mechanisms or credentials different from that in the existing home access network. For example, in case of a WLAN, the access node can be an access point or a combination of an access point and a WLAN controller (switch/router), which provides network connection (e.g. Internet connection) via WLAN access to its home UEs. If the access node decides to provide its resources for the network access service, the access node acts as a VAN and configures a visited WLAN section with a Service Set Identifier (SSID) specific for the network access service, which is different from the SSID of the existing home WLAN section. The access node may configure the visited WLAN section with security settings different from that of the home WLAN section, data rate, etc.

It should be noted that each VAN can be implemented as a single entity that provides the functions as described in this invention, or it can be implemented as multiple network entities that collectively provide the functions as described in this invention. For example, in a WLAN scenario, a VAN can be an access point that provides the functions as described in this invention, or it can comprise an access point and a WLAN controller (switch/router) that provide the functions as described in this invention in a collaborative way.

Upon the decision to contribute to network access service for VTs using the configured visited WLAN section, the VAN initiates a VAN registration procedure to register with one or more SGWs. If the VAN registration procedure is successful, the VAN can start offering the network access service by transmitting in its serving area information that indicates the availability of the network access service and enables VTs to initiate a procedure to connect to the visited access network section.

Furthermore, in order to collect convincing charging/rewarding information on the usage of the network access service, the VAN also configures the visited access network section so that all traffics of user data to/from the VTs of the visited access network section are received/transmitted from/to the one or more SGWs with which the VAN has registered. That way, all traffics of user data using the VAN can be observed in the one or more SGWs managed by the network access service provider for the charging/rewarding purposes. The collected charging/rewarding information should be able to be associated with the permanent identities/accounts of the VT and the VAN, respectively, for billing/rewarding purposes. In addition, to avoid the traffic to/from the VTs of the visited access network section being exposed to the VAN or any third party, each of the VTs should establish a secured communication (e.g. a VPN/tunnel) with one of the one or more SGWs for security signaling information (such as messages carrying the permanent VT identity) and user data exchange.

Figure 2:
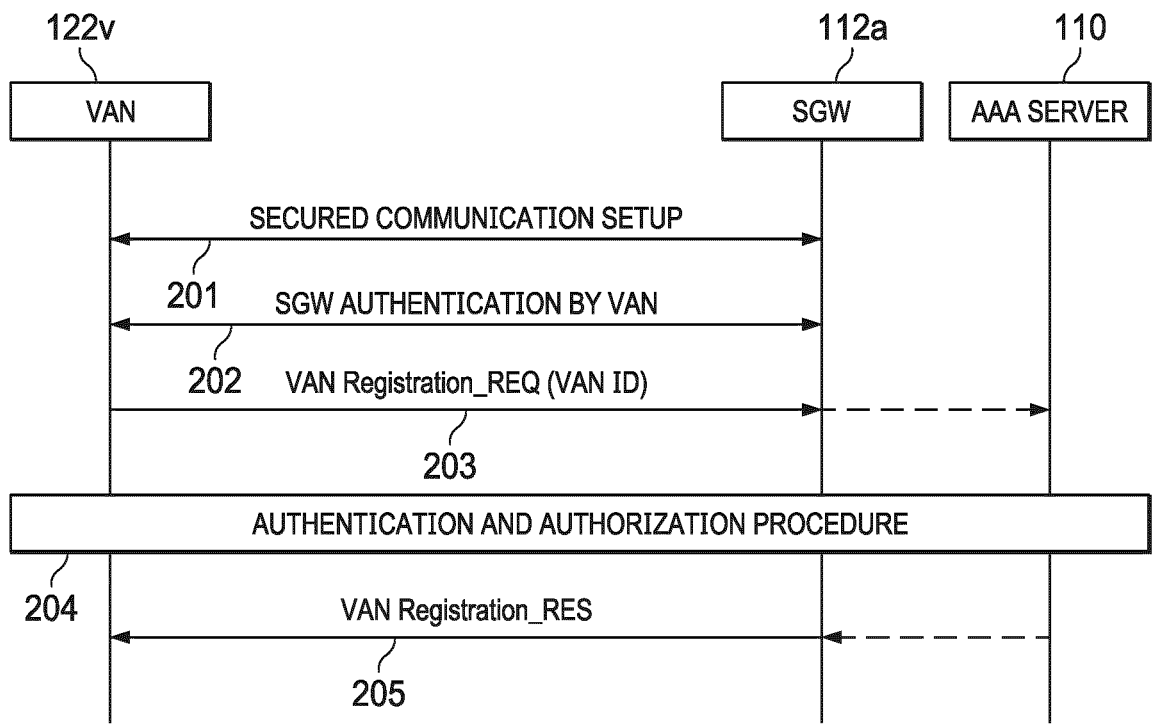
FIG. 2 illustrates an example of a VAN registration procedure.

FIG. 2 provides an example of a VAN registration procedure according to the invention.

A VAN determines a SGW to register with. A set of SGW IDs/addresses may be configured in the VAN upon its subscription with the network access service provider for the network access service. Alternatively, the VAN can query a network server (e.g. a DNS server further configured to assign SGWs) to obtain an assigned SGW with which the VAN may register.

Then, the VAN establishes a secured communication with the SGW using a security mechanism such as the IKE_SA_INIT exchanges in IKEv2 (Internet Key Exchange version 2 as defined in RFC7296) and the like (Step 201). The established security parameters are used as a base for following communications between the VAN and the SGW. VAN and the SGW use the established secured communication to carry out mutual authentication.

The authentication on the SGW may use a procedure such as the IKE_AUTH exchanges defined in IKEv2 based on pre-shared keys or certificates (Step 202). The SGW can be configured with its security credential for this procedure through network management means. The VAN can be configured with its security credential for this procedure manually or automatically through a signaling procedure, if it has been subscribed for the network access service. In an embodiment, each of VANs and SGWs of the network access service is configured with a shared key for VAN registration procedures. In another embodiment, the SGW is configured with a certificate issued by a certificate authority (CA) provided or trusted by the network access service provider for VAN registration procedures, and the VAN is configured with a trust anchor that can be used to validate the certificate of the SGW for VAN registration procedures. If the authentication on the SGW fails, the VAN stops the registration procedure.

The authentication and authorization on the VAN can use a mechanism such as EAP (Extensible Authentication Protocol) over IKEv2 (EAP-IKEv2 as defined in RFC5106), and the like (Step 203). The VAN provides the SGW with its permanent identity (VAN ID) in a VAN registration request carried in an EAP-IKEv2 message using the secured communication between the VAN and the SGW. The SGW obtains the VAN ID in the VAN registration request from the EAP-IKEv2 message for authentication and authorization purpose, and further directs it to an AAA server to trigger an authentication and authorization procedure between the VAN and the AAA server (Step 204). The SGW exams EAP-IKEv2 messages it receives from the VAN and transmits relevant information obtained from the EAP-IKEv2 messages to the AAA server (and vice versa) so that the address or identity of the AAA server is not exposed to the VAN. The security credentials used for the authentication and authorization on the VAN should be configured in the AAA server and the VAN correspondingly if the VAN has been subscribed for the network access service. The VAN registration request sent by the VAN may optionally include the VAN's SSID in case of WLAN, which is to be used to specifically identify the WLAN for the network access service.

If the authentication and authorization procedure on the VAN succeeds, the AAA server notifies the success to the SGW. The SGW may further establish, with the VAN using a keying mechanism as defined in IKEv2 or the like, security parameters to be used for signaling communications between the VAN and the SGW. The SGW creates a VAN context for the VAN. The VAN context comprises the VAN ID and the address of the VAN, an indication of registration status and the security parameters to be used for signaling communications between the VAN and the SGW. The VAN context may optionally comprise the VAN's SSID in case of WLAN. The SGW indicates a registration success to the VAN as a VAN registration response carried in an EAP-IKEv2 message or another form of message (Step 205). The SGW should maintain the VAN context of the VAN at least during the period when the VAN is registered with the SGW. The SGW may change the indication of registration status from "registered" to "de-registered" or delete the VAN context of the VAN if the VAN de-registers from the SGW. The VAN may de-register from the SGW, e.g. according to a predetermined schedule or if it detects that no VT in its access network is using the network access service through the SGW.

If the authentication and authorization procedure fails, the AAA server notifies the failure to the SGW. The SGW in turn indicates a registration failure to the VAN as a VAN registration response carried in an EAP-IKEv2 message or the like (Step 205) and then releases the secured communication between the VAN and the SGW. If desired, the SGW could initiate a retry procedure for the registration and authentication, for example to permit the VAN to register or authenticate using different or corrected credentials or with a different AAA server, or to overcome a communications error in the first attempt.

Upon receiving a VAN registration response indicating a registration success, the VAN records this SGW as one of the one or more SGW with which it has registered, and stores information related to this SGW, such as its SGW ID and/or address and the security parameters used for communications between the VAN and the SGW.

The VAN may decide to further register with another SGW. In this case, step 201 is repeated towards that SGW.

Figure 3A:
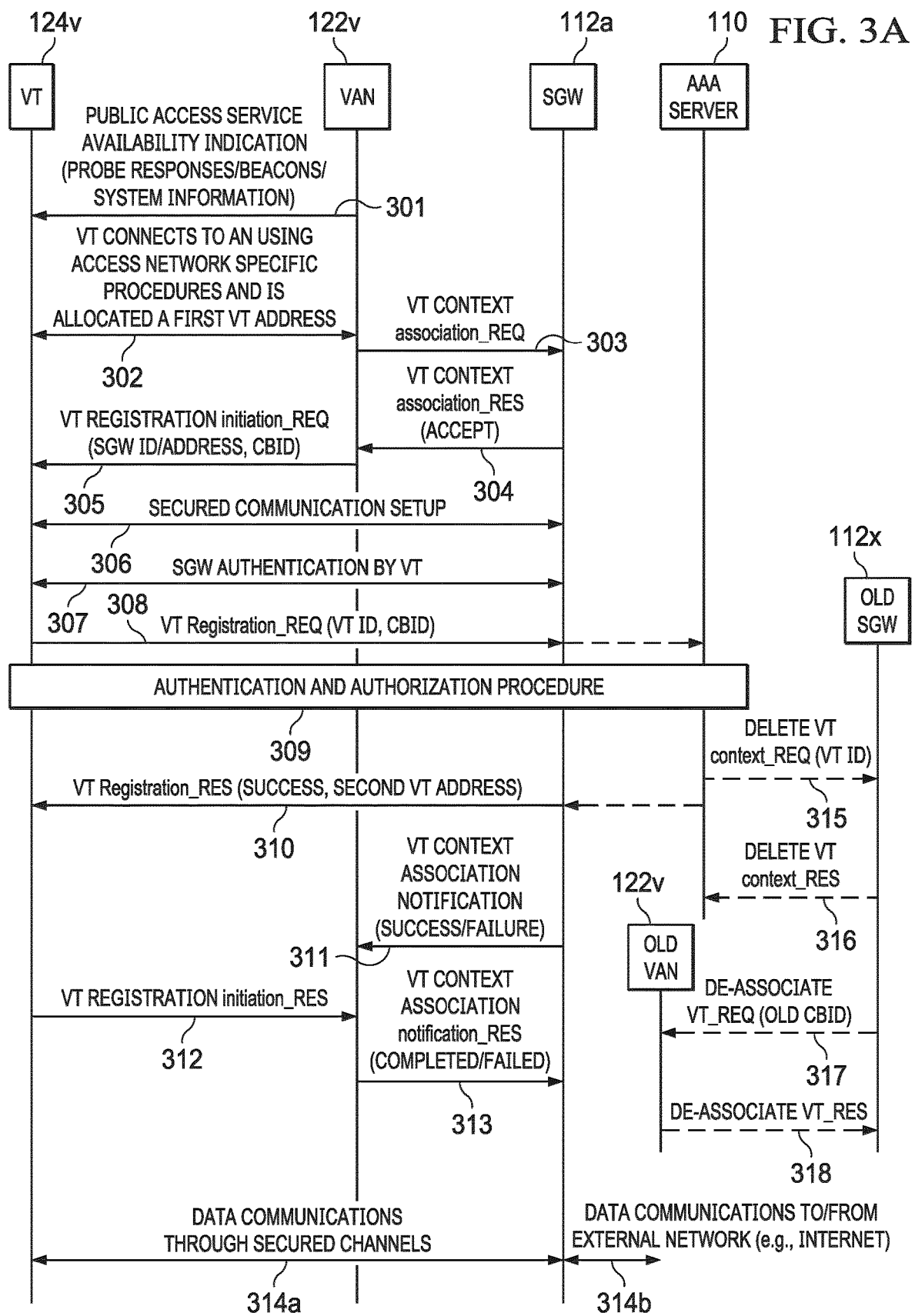
FIG. 3A illustrates an example of a VT registration procedure.

FIG. 3A provides an example of a VT registration procedure according to the invention.

After the VAN has successfully registered with at least one SGW, the VAN may transmit in its serving area information that enables VTs to initiate an access procedure (Step 301). Such information includes that is used in existing access networks, and preferably further includes an availability indication of the network access service to facilitate VTs to discover the network access service.

For example, in case of a WLAN, the VAN starts broadcasting beacons in its serving area. The beacons include the VAN's SSID, the supported data rates and the security mechanism of the visited WLAN. The VAN's SSID is preferably configured to comprise a specific part indicating the WLAN with this VAN's SSID is available for the specific network access service. The beacons may alternatively or further include an extension part for indicating the availability of the specific network access service in the WLAN with this VAN's SSID. By listening to the beacons in this visited WLAN, a VT is able to discover the availability of the specific network access service to which it has subscribed.

Another way to facilitate service discovery is that, a VT includes an indication of seeking a specific network access service to which it has subscribed to in a WLAN probe. The VAN that is available for the specific network access service sends back a probe response with an availability indication of the specific network access service.

After service discovery, the VT selects a visited access network for the network access service. The VT then tries to connect with the selected VAN using procedures specific to the visited access network (Step 302).

In an example of WLAN, the VT may select a visited WLAN based on information collected from probe responses and/or beacons. Then, it starts authentication process with the VAN (e.g. an access point or an access point connected with a WLAN controller) of the selected visited WLAN. Since the VT will be authenticated by the AAA server through a SGW and its traffic will be protected by a secured communication channel between the VT and the SGW, as will be described in steps 306-310, the visited WLAN can use a simple authentication mechanism, such as an open authentication or a shared key authentication. The shared key authentication may use Wired Equivalent Privacy (WEP) protocol. The shared key can be respectively configured, manually or automatically through a signaling procedure, in all VTs and VANs subscribed for the network access service. A simple security mechanism in the visited WLAN may help the reduction of radio signaling overhead.

After being successfully authenticated by the visited WLAN, the VT carries out a WLAN association procedure with the VAN and is consequently allocated a first VT address through the VAN if the association procedure succeeds. For example, the first VT address may be an IPv4 or IPv6 address that can be used by the VT to communicate with the one or more SGWs and other network entities of the network access service. In one embodiment, the VAN then assigns a Context Binding ID (CBID) for binding the VT and the VAN, so that the one or more SGWs can use the CBID assigned for the VT as a reference to establish an association between the VAN's context and the VT's context. The VAN may assign a CBID for binding the VT and the VAN in such way that the CBID can uniquely identify the VT in the one or more SGWs for a period when the terminal is connected to the gateway through the VAN. For example, the CBID of the VT may be constructed with an SGW number/address part, a VAN number/address/SSID part and a VT specific part (e.g. the first VT address or a sequence number) that is unique in the access network of the VAN for a period when the terminal is connected to the VAN. In an alternative embodiment, the CBID for binding the VT and the VAN is assigned by the SGW instead of the VAN.

At this point, the VAN maintains information on the MAC address, the first VT address and treats the VT as a candidate for the network access service. In the embodiment that the CBID is assigned by the VAN, the VAN also maintains the CBID of the VT. As a candidate for the network access service, the VT is allowed to use access network resources of the VAN for a VT registration procedure with a SGW for the network access service. The VT is addressed by the first VT address in the VT registration procedure for the communication with the SGW and other network entities of the network access service.

If the association procedure fails or the VT is not allocated the first VT address after a certain time period, the VAN should disconnect the VT from the WLAN by, for example, through disassociation process.

The VAN sends a VT context association request to one of the one or more SGWs with which the VAN has registered (Step 303). In the embodiment that the CBID is assigned by the VAN, the VT context association request also includes the CBID of the VT, which is used by the SGW to associate the VAN (identified by one or more of its VAN ID, its address and its SSID based on the VAN's context maintained in the SGW) with the VT.

If the SGW receiving the VT context association request including the CBID of the VT decides to serve the VT, it sends a VT context association response indicating an acceptance of the request to the VAN (Step 304). In the embodiment that the CBID is assigned by the SGW, the VT context association request received by the SGW does not include the CBID of the VT. In this case, if the SGW decide to serve the VT, it assigns a CBID for binding the VT and the VAN sending the VT context association request. The SGW may assign the CBID in such way that the CBID can uniquely identify the VT in the SGW for a period when the terminal is connected to the gateway through the VAN. For example, the CBID of the VT may be constructed with an SGW number/address part, a VAN number/address/SSID part and a VT specific part that is unique in the access network of the VAN for a period when the terminal is connected to the VAN. Alternatively, the CBID of the VT can simply be a sequence number that is unique in the SGW. Then, the SGW sends a VT context association response including the CBID assigned for the VT and indicating an acceptance of the request to the VAN. The SGW further prepares for a VT registration procedure by maintaining information about a temporary association between the VAN (identified by one or more of its VAN ID, its address and its SSID based on the VAN's context maintained in the SGW) and the CBID of the VT (identified by its CBID in the SGW so far). At this point, the SGW may start a timer. If the VT associated with the CBID does not initiate a VT registration procedure with the SGW as described in step 308 within a time period set by the timer, the SGW indicates the failure to the VAN using a VT context association notification message with a failure indication and clear the information on the temporary association between the CBID of the VT and the VAN.

It is advantageous that a temporary CBID for binding a VT and a VAN is assigned by the VAN or a SGW when the VT starts to establish a connection to the SGW through the VAN and is cleared when the connection between the VT and the SGW through the VAN is released. Using the temporary CBID for the VT, the VT and the VAN can be bound together, e.g. for charging and rewarding purpose, but need not disclose their permanent identities such as VT ID and VAN ID to each other.

If the SGW receiving the VT context association request cannot serve the VT due to heavy traffic load or other reasons, it may send a VT context association response indicating rejection of the request to the VAN, so that the VAN can send the VT context association request to another SGW. Alternatively, the SGW may use a procedure as described in FIG. 4 to redirect the request to another SGW.

Figure 4:
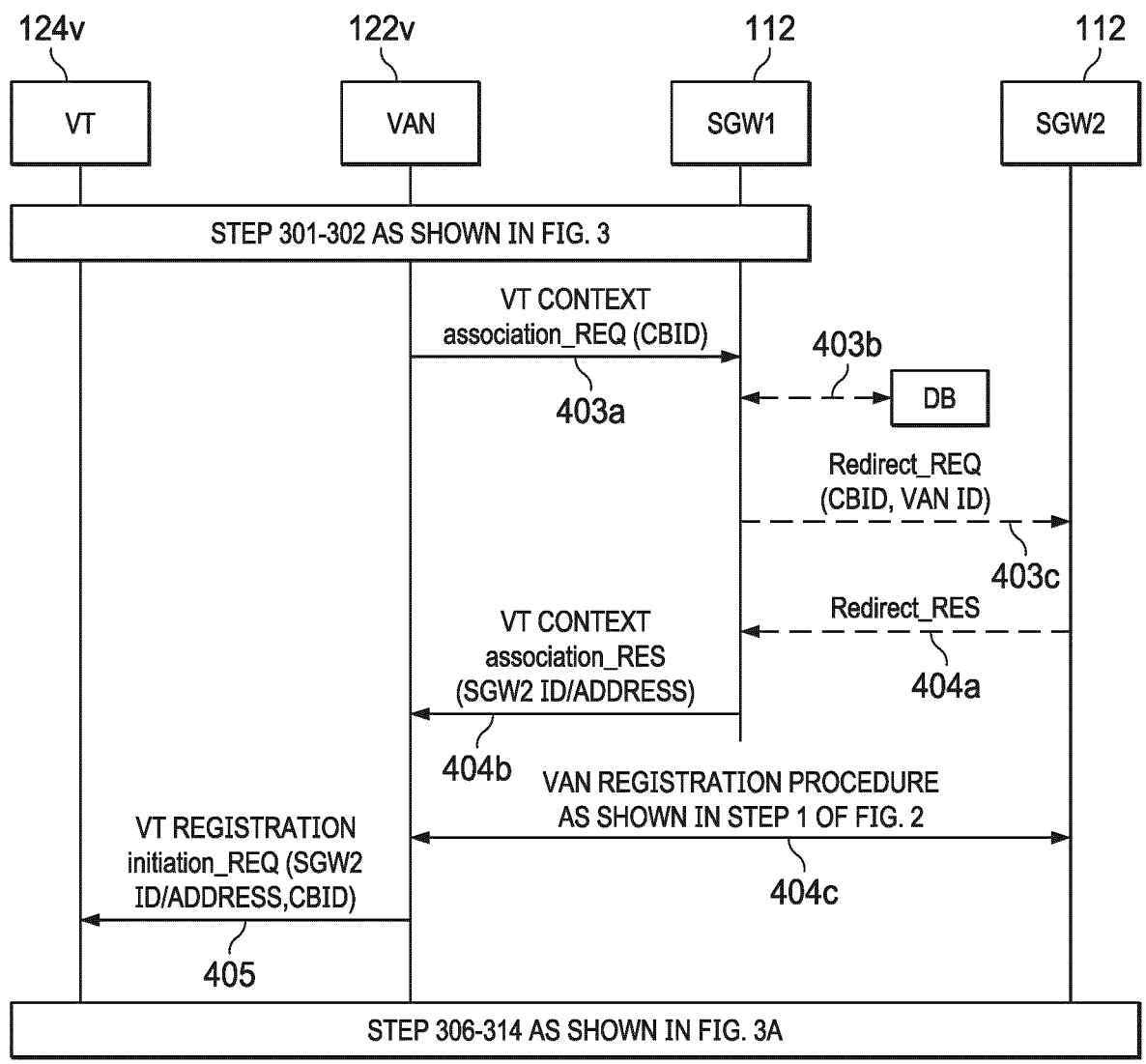
FIG. 4 illustrates an example of SGW redirect signaling procedure.

In FIG. 4, the SGW that receives the VT context association request is SGW1 (step 403a). Assuming SGW1 is not able to serve the VT, it may consult with a database DB to find another available SGW, say SGW2, to redirect the request to (step 403b). The DB can be a database associated with network management functions, which can be embedded in the SGW1 or external to the SGW1. SGW1 then sends SGW2 a redirect request, which includes the VAN's VAN ID and/or address (step 403c). In the embodiment that a CBID is assigned by a VAN, the redirect request also includes the CBID of the VT received from the VAN. If SGW2 is able to serve the VT indicated in the redirect request, it sends SGW1 a redirect response indicating acceptance of the redirect request (step 404a). In the embodiment that the CBID is to be assigned by a SGW, the SGW2 then assigns the CBID for binding the VT and the VAN. The SGW2 further maintains information about a temporary association between the CBID of the VT (identified by its CBID in SGW2 so far) and the VAN (identified by its VAN ID). If the VAN has not been registered in SGW2, SGW2 starts a timer waiting for the VAN to initiate a VAN registration procedure. SGW2 should delete the information on the temporary association between the CBID of the VT and the VAN if the VAN does not initiate a VAN registration procedure within a period defined by the timer. If the VAN has registered with SGW2, SGW2 starts a timer waiting for the VT of the CBID to initiate a VT registration procedure with SGW2.

Upon receiving a positive redirect response from SGW2, in step 404b, SGW1 sends the VAN a VT context association response including SGW2's ID and/or address, indicating that the request is redirected to SGW2. The VAN checks whether it has registered with SGW2. If not, it initiates a VAN registration procedure in step 404c, which is similar to the VAN registration procedure of FIG. 2. If the VAN has registered with SGW2, it proceeds to step 405, which is similar to step 305 in FIG. 3A.

Referring back to step 305 in FIG. 3A, the VAN sends a VT registration initiation request to the VT to instruct the VT to register with a SGW. The VT registration initiation request provides the VT with a SGW ID and/or address and the CBID assigned for the VT, instructing the VT to initiate a VT registration procedure with the SGW indicated by the SGW ID/address. The SGW ID and/or address is the ID and/or address of the SGW in case of FIG. 3A, if the SGW in FIG. 3A has accepted the VT context association request. The SGW ID and/or address is the ID and/or address of SGW2 in case of FIG. 4.

Sending the VT registration initiation request may trigger a timer in the VAN with regard to the VT. If a VT registration initiation response is not received from the VT within a predetermined time period, the VAN disconnects the VT from the visited access network.

The VT initiates a procedure to setup a secured communication and carry out a mutual authentication with the SGW indicated in the VT registration initiation request, using the first VT address (Step 306). For example, a tunnel can be established between the VT and the SGW using a security mechanism such as the IKE_SA_INIT exchanges in IKEv2 and the like. The established security parameters can be used as a base for following communications between the VT and the SGW. Then VT and the SGW use the established secured communication to carry out mutual authentication.

The authentication on the SGW may use a procedure such as the IKE_AUTH exchanges defined in IKEv2 based on pre-shared keys or certificates (Step 307). The SGW can be configured with its security credential for this procedure through network management means. The VT can be configured with its security credential for this procedure manually or automatically through a signaling procedure, if it has been subscribed for the network access service. In an embodiment, each of VTs and SGWs of the network access service is configured with a shared key for VT registration procedures. In another embodiment, the SGW is configured with a certificate issued by a certificate authority (CA) provided or trusted by the network access service provider for VT registration procedures, and the VT is configured with a trust anchor that can be used to validate the certificate of the SGW for VT registration procedures. If the authentication on the SGW fails, the VT stops the registration procedure.

The authentication and authorization on the VT can use a mechanism such as Extensible Authentication Protocol (EAP) over IKEv2 and the like. The VT provides the SGW with the permanent identity (VT ID) and the CBID of the VT in a VT registration request carried in an EAP-IKEv2 message using the secured communication between the VT and the SGW (Step 308). The SGW checks whether the received CBID of the VT can be found in the temporary associations currently maintained in the SGW. If the received CBID of the VT cannot be found in the temporary associations currently maintained in the SGW, the SGW releases the secured communication with the VT. Otherwise, it clears the timer set for the VT of the CBID to initiate a VT registration procedure and obtains the VT ID from the VAN registration request in the EAP-IKEv2 message for authentication and authorization purpose. The SGW further directs the VT ID from the VAN registration request to an AAA server governing the VT ID to trigger an authentication and authorization procedure between the VT and the AAA server (Step 309). The SGW exams EAP-IKEv2 messages it receives from the VT and transmits relevant information obtained from the EAP-IKEv2 messages to the AAA server (and vice versa) so that the address or identity of the AAA server is not exposed to the VT. The security credentials used for the authentication and authorization on the VT should be configured in the AAA server and the VT correspondingly if the VT has been subscribed for the network access service.

If the authentication and authorization procedure with regard to the VT is successful, the AAA server registers the SGW as the serving SGW for the VT and inform the SGW of the success of the authentication and authorization on the VT. The SGW may further establish, with the VT using a keying mechanism as defined in IKEv2 or the like, security parameters to be used for user data and signaling communications between the VT and the SGW. Furthermore, the SGW allocates a second VT address (e.g. an IPv4 or IPv6 address) for the VT to communicate with external networks beyond the SGW and establishes a VT context for the VT. The VT context maintains information such as the VT ID, the first and second VT addresses, the security parameters for user data and signaling communications between the VT and the SGW, a status (e.g. active or de-registered) indicator of the VT context and so on. Based on the CBID of the VT received in the VT registration request and the maintained temporary association between the CBID of the VT and the VAN (identified by one or more of its VAN ID, its address and its SSID based on the VAN's context maintained in the SGW), the SGW associates the VAN ID (and optionally the VAN's address and SSID) of the VAN currently serving the VT with the established VT context. The SGW may further assign a charging identifier (charging ID) associated with the VT context and the VAN ID currently associated with the VT context. The charging ID has a one-to-one mapping to the CBID, or the CBID of the VT can be used as the charging ID. At this point, the SGW sends a VT registration response to the VT, indicating that it has successfully registered the VT (Step 310). Optionally, the VT registration response includes the second VT address allocated to the VT so that the VT uses the second VT address to build data packets to/from an external network such as Internet. The data packets built using the second VT address is encapsulated in a secured user data channel between the VT and the SGW. Alternatively, the SGW does not need to send the second VT address to the VT if the SGW implements a Network address translation (NAT) mechanism to translate between the first VT address and the second VT address.

The SGW also sends a VT context association notification message to the VAN associated with the VT of the CBID, including a success indication of the association between the VAN and the context of the VT of the CBID (Step 311).

If the authentication and authorization procedure with regard to the VT is unsuccessful, the AAA server informs the SGW of the failure. The SGW then sends a VT registration response indicating the failure to the VT, releases the established communication channel with the VT and clears the temporary association between the CBID of the VT and the VAN. In this case, the SGW also sends a VT context association notification message indicating that the registration of the VT of the first VT address has failed. If desired, the SGW could initiate a retry procedure for the registration and authentication, for example to permit the VT to register or authenticate using different or corrected credentials or with a different AAA server, or to overcome a communications error in the first attempt.

Upon receiving a VT registration response, the VT checks whether it indicates a success or a failure. If it indicates a success, the VT sends a VT registration initiation response to the VAN, indicating a successful VT registration (Step 312). The VT saves information to be used for user data and signaling communications between the VT and the SGW such as security parameters. The VT also saves the second VT address for user data and signaling communications between the VT and the SGW, if it is provided in the VT registration response. If the VT registration response indicates a failure, the VT releases the established communication channel with the SGW and disconnects from the VAN. If desired, the VT could initiate a retry procedure for its registration, for example to attempt to register or authenticate using different or corrected credentials, or to overcome a communications error in the first attempt.

The VAN clears the timer for the VT registration initiation response with regard to the VT once the VT registration initiation response indicating a successful VT registration is received from the VT. The VAN starts to monitor traffics to/from the VT based on the MAC address and/or the first VT address of the VT, to allow the traffics from/to the address and/or a predefined port number of the SGW with which the VT has registered and block the traffics from/to other addresses and/or port numbers. For example, if a TCP/UDP port number is defined to be used normally by the network access service, the VAN can filter the traffics based on the predefined TCP/UDP port number.

If the VT context association notification message indicating a successful association between the VAN and the context of the VT of the CBID is received from the SGW and the timer for the VT registration initiation response has been cleared, the VAN maintains information related to the VT such as the MAC address, the first VT address and the CBID assigned for the VT until de-registration or disassociation of the VT. The VAN sends a VT context association notification response message to the SGW, indicating the VT context association procedure has been successfully completed (Step 313).

In response to receiving the VT context association notification response message with an indication of successful completion, the SGW activates the established VT context for the VT, e.g. by setting the status indicator to active. The SGW then starts to observe the traffics to/from the VT to collect charging information with regard to the VT. The observation can be carried out based on information that can be used to identify the traffic of the VT, such as the first/second VT address of the VT. The collected charging information is bound together using the charging ID associated with the active VT context. The observation may focus on one or more parameters that can be used to monitor the network resources consumed by the VT. The one or more parameters comprise one or more of: a registered period of the VT with the SGW, the starting time and the ending time of the registered period, the bandwidth consumed by the VT, the amount of data transmitted/received for the VT, etc.

Since all the traffics to/from the VT using the access network of the VAN are directed to the SGW (e.g. through the tunnel between the VT and the SGW), the charging information can be collected in the SGW with regard to the VT. This is mainly because that data traffic reasonably reflects the network resource consumed by the VT in the access network of the VAN, or equivalently the network resource contributed by the VAN to the VT (for example, amount of data observed in the access network generally equals to amount of data observed in the SGW minus management/signaling overheads). Therefore, the charging information collected by the SGW with regard to the charging ID can be used for both charging the VT and rewarding the VAN. Therefore, the SGW should associate the charging ID with the VT ID for the purpose of charging to the VT's account for the use of the network access service. Similarly, it should also associate the charging ID with the VAN ID for the purpose of rewarding to the VAN's account for contributing access network for the network access service.

If the VT context association notification message indicating a failure is received from the SGW or the timer for the VT registration initiation response has expired, the VAN sends a VT context association notification response message to the SGW, indicating the VT context association procedure has failed. The VAN also disconnects the VT and clears all the information maintained for the VT. The SGW disconnects the VT, clears the VT context and the associated CBID/charging ID assigned for the VT in response to receiving the indication that the VT context association procedure has failed. If desired, the VAN could initiate a retry procedure for the registration and authentication, for example by prompting the VT to register or authenticate using different or corrected credentials, or to overcome a communications error in the first attempt.

Having successfully registered for the network access service, the VT can use the secured communications established between the VT and the SGW for data communications with external networks such as Internet (Step 314). The VT uses the first VT address for the secured communications with the SGW and the second VT address, if received, for communications with external networks beyond the SGW. If the second VT address is not sent to the VT, the SGW uses NAT to translate the first VT address to/from the second VT address for the data packets to/from external networks.

If there is a previous SGW (say, old SGW) that has been registered in the AAA server as the serving SGW for the VT, upon the AAA server considering that the authentication and authorization procedure with the VT through the current SGW succeeds, the AAA server sends a request including the VT ID to the old SGW to delete the old VT context maintained in the old SGW for the VT (Step 315). In response, the old SGW deletes the VT's old context it maintained and other information associated with the VT's old context, formulates collected charging information with regard to the VT's old context, sends the formulated charging information to a billing/rewarding entity and sends back a delete VT context response to the AAA server, confirming the deletion of the VT's old context (Step 316).

Once the old SGW receives the delete old VT context request from the AAA server, it also instructs the previous VAN (i.e. old VAN) serving the VT to remove the association between the VT and the old VAN (Step 317). The old SGW provides the old VAN with the VT's old CBID known by the old VAN. The old VAN clears maintained information related to the VT of the old CBID indicated in the de-associate VT request and sends back a response to the old SGW, confirming the disassociation of the VT (Step 318).

The VT context association messages exchanged between the VAN and the SGW in steps 303, 304, 311, 313 in a specific VT registration procedure are correlated together, e.g. by using a same message ID or transaction ID in message headers. Similarly, the VT registration initiation messages exchanged between the VAN and the VT in steps 305 and 312 in a specific VT registration initiation procedure are correlated together, e.g. by using a same message ID or transaction ID in message headers.

Figure 3B:
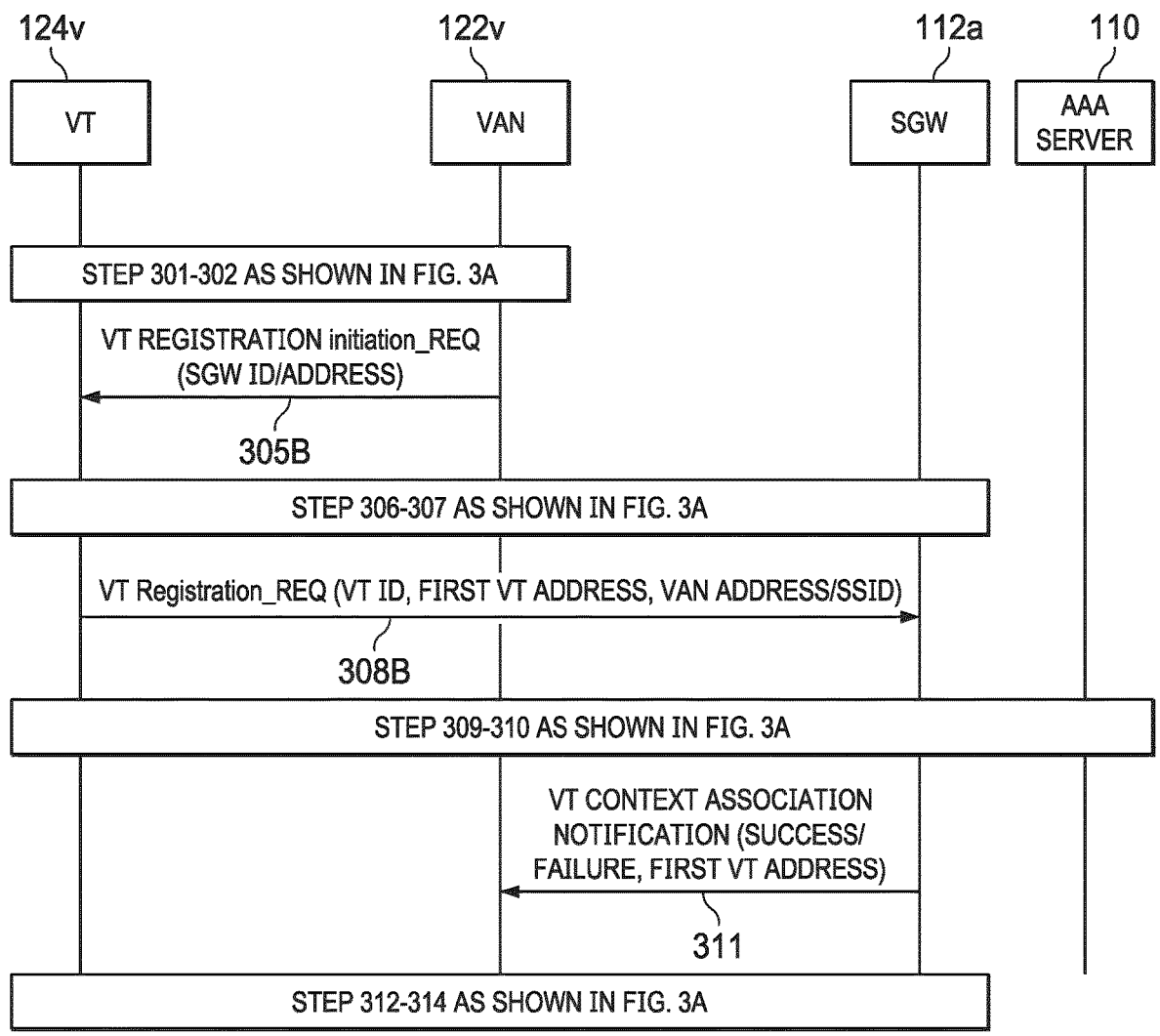
FIG. 3B illustrates another example of a VT registration procedure.

In an alternative solution as shown in FIG. 3B, step 303 and step 304 in FIG. 3A are not performed. In this case, the VAN sends a VT registration initiation request to the VT, providing the SGW ID/address of one of the SGWs with which the VAN has registered (step 305B). The VT then should provide its VT ID, the first VT address and the VAN's address or SSID to the SGW in the VT registration request sent to the SGW. The SGW associates the VT and the VAN based on the first VT address and the VAN address/SSID provided by the VT and the VAN context maintained in the SGW. If the registration of the VT is successful, the SGW sends the VAN corresponding to the VAN address/SSID a VT context association notification, indicating the successful registration of the VT corresponding to the first VT address. This solution requires that the first VT address can be used to uniquely identify the VT in the SGW. If there is a NAT function between the VT and the SGW, then the first VT address cannot be used for binding the VT and the VAN.

Figure 5:
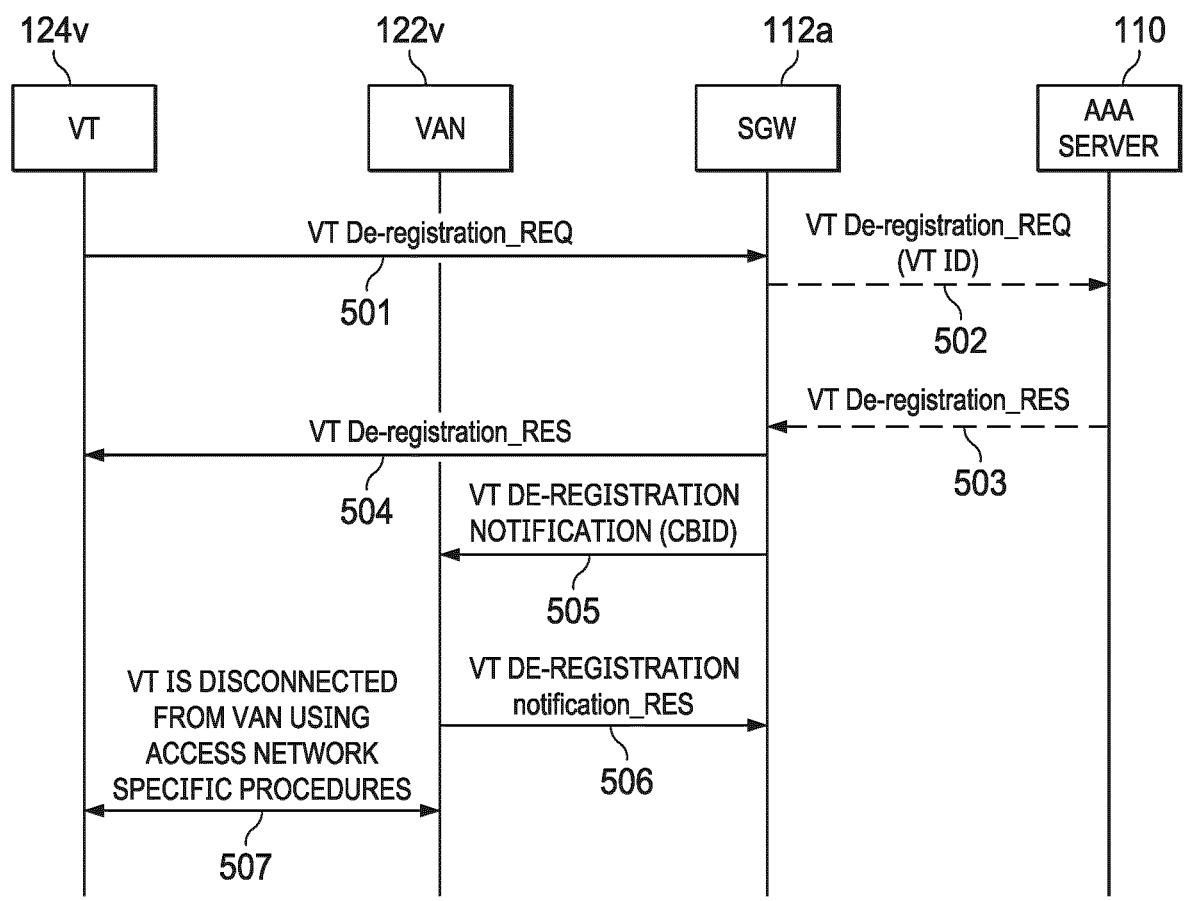
FIG. 5 illustrates an example of a VT initiated VT de-registration procedure.

If a registered VT does not need to use the network access service, it can initiate a procedure to de-register from the network access service, as shown in FIG. 5.

The VT sends a VT de-registration request to the SGW (Step 501). The VT de-registration request may include the VT ID of the VT or the CBID of the VT.

The SGW sends a VT de-registration request including the VT ID to the AAA server (step 502). The VT ID is the one included in the VT de-registration request received from the VT or retrieved by the SGW using the CBID of the VT or the first VT address used by the VT de-registration request based on the VT context. The AAA server removes the SGW from the serving SGW registry related to the VT indicated in the VT de-registration request, and sends back to the SGW a VT de-registration response (step 503), indicating a completion of de-registering the VT in the AAA server.

The SGW sends a VT de-registration response to the VT and then releases the secured communications established for the VT (Step 504). The SGW also sends a VT de-registration notification to the VAN indicating that the VT of the CBID has been de-registered (Step 505). The VAN responds the SGW with a VT de-registration notification response message (Step 506). It should be noted that step 502, step 504 and step 505 can happen at the same time or any different sequence.

Having received the VT de-registration response from the AAA server and optionally the VT de-registration notification response from the VAN, the SGW executes a VT de-activation procedure for the VT as follows. The SGW formulates charging information collected by the SGW and provides the formulated charging information to a billing/rewarding entity for charging/rewarding purpose. Then, the SGW removes the first VT address, the second VT address, the CBID and optionally the security parameters related to the first VT address from the VT context and changes the status indicator of the VT context to de-registered. The SGW may keep the de-registered context of the VT for a predetermined period, in case another procedure may need to interrogate some information related to the VT context. When the predetermined period expires, the SGW deletes the de-registered context of the VT.

The VT disconnects from the VAN once it receives the VT de-registration response from the SGW. The VAN should make sure that the VT is disconnected and the maintained information for the VT is cleared after the VT de-registration notification response is sent.

Figure 6:
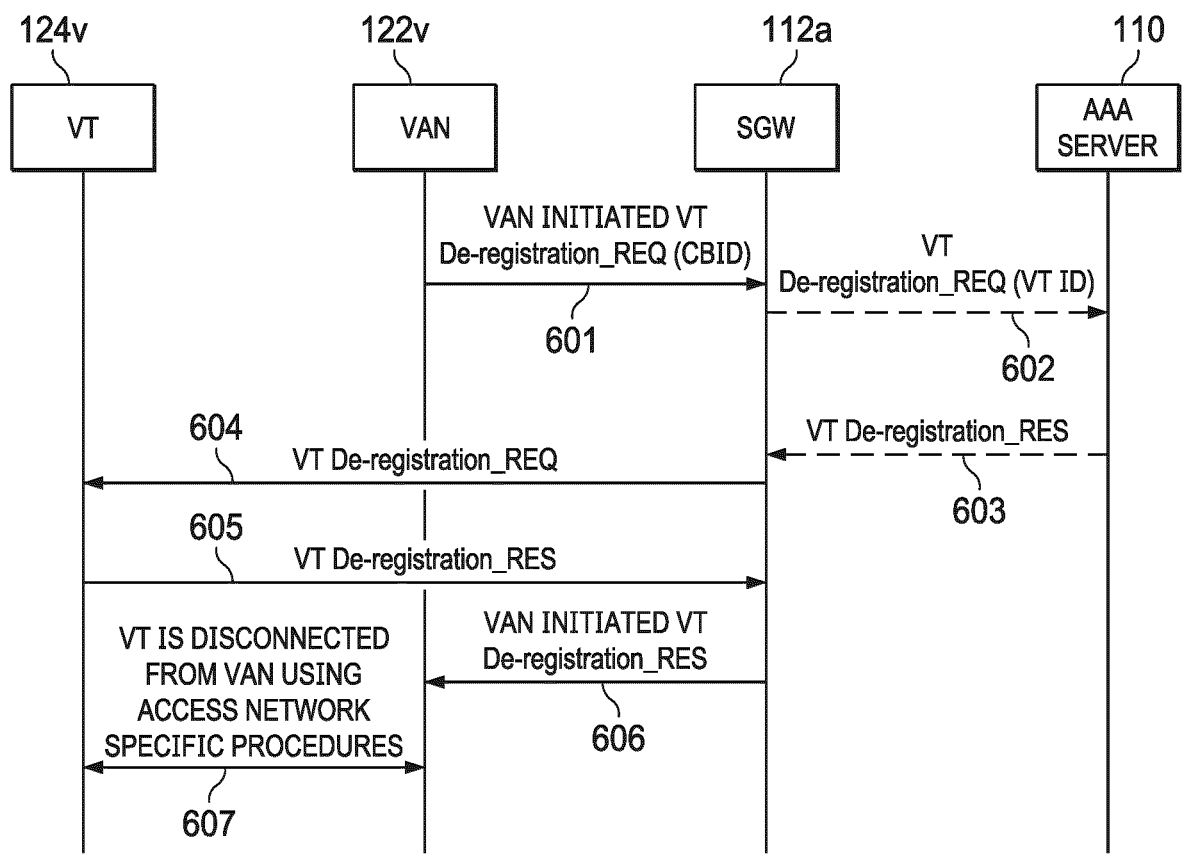
FIG. 6 illustrates an example of a VAN initiated VT de-registration procedure.

In a case that the VAN detects a short of access network resources or the VAN detects that the VT has been inactive or cannot be reached by the VAN for a pre-determined time period, the VAN may initiate a VAN initiated VT de-registration procedure to de-register the VT from the network access service, as shown in FIG. 6.

The VAN sends a VAN initiated VT de-registration request to the SGW (Step 601). The VT de-registration by VAN request includes the CBID of the VT. The VT de-registration by VAN request may indicate a reason for de-registration. The reason could be, e.g. short of access network resource in current VAN or inactive VT.

Based on the received CBID included in the VT de-registration by VAN request, the SGW retrieves the VT ID from the VT context associated with the CBID and sends a VT de-registration request including the VT ID to the AAA server (Step 602). The AAA server removes the SGW from the serving SGW registry for the VT indicated in the VT de-registration request and sends back to the SGW a VT de-registration response (Step 603).

If the reason for de-registration is short of access network resource, the SGW the SGW retrieves the first VT address from the VT context associated with the CBID and sends a VT de-registration request to the first VT address of the VT (Step 604). The VT de-registration request may further instruct the VT to register for the network access service through one of the other VANs. The VT sends a VT de-registration response to the SGW if it receives the VT de-registration request from the SGW (Step 605).

The SGW sends a VAN initiated VT de-registration response to the VAN (Step 606). Then the SGW executes a VT de-activation procedure for the VT of the first VT address, which is similar to that as described in the procedure of FIG. 5.

The VT is disconnected from the VAN using a procedure similar to that as described in the procedure of FIG. 5.

Figure 7:
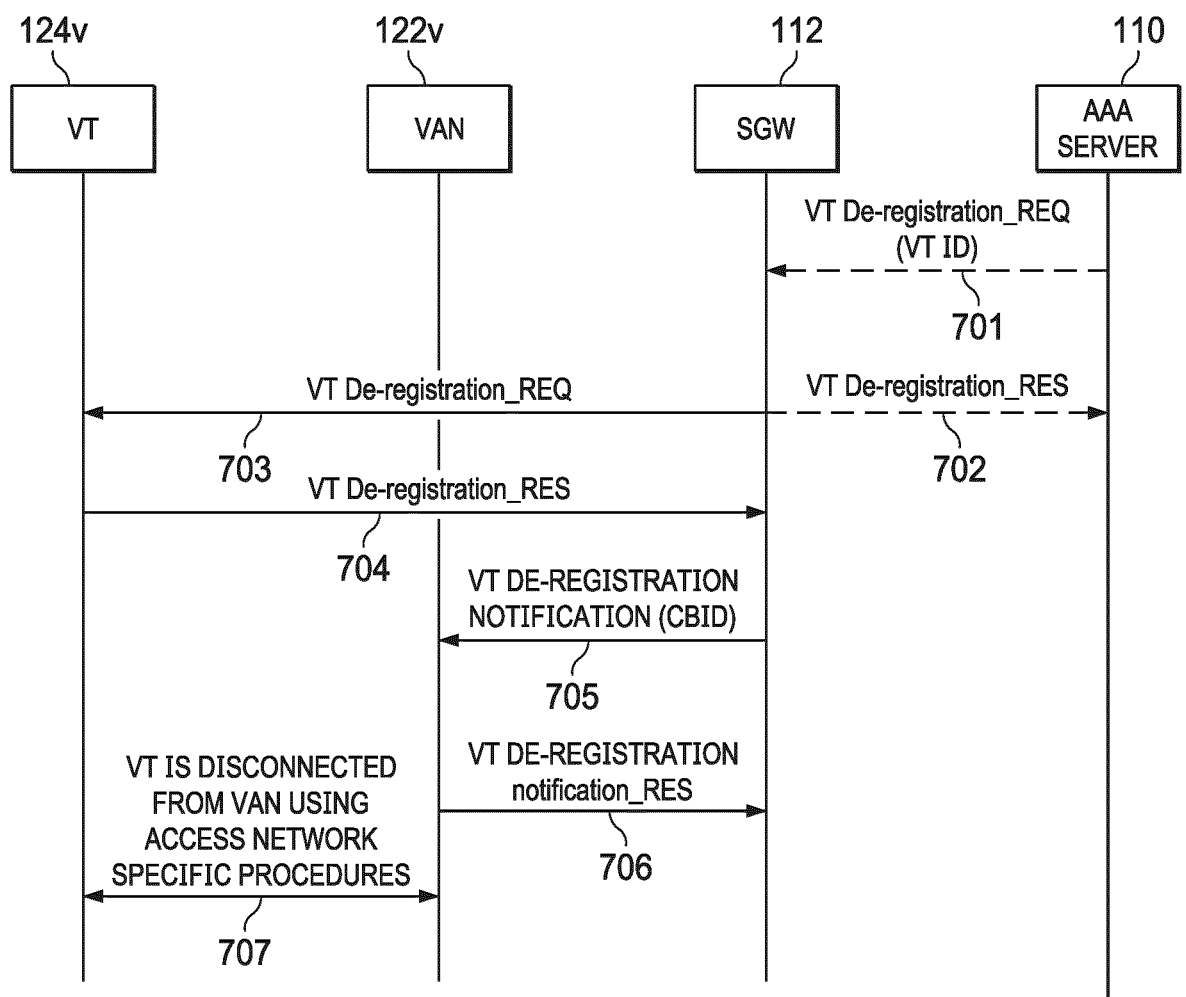
FIG. 7 illustrates an example of a network-initiated VT de-registration procedure.

After the VT has registered with the SGW, the SGW may be configured to require the VT to periodically execute a re-registration/re-authentication procedure with the SGW. The SGW may also be configured to use a mechanism such as heartbeat signals or probe messages to check whether its connection with the VT is normal or not. If the SGW having detected an abnormal connection status with the VT, for example, the VT does not execute a re-registration/re-authentication procedure within a pre-determined period or the SGW does not receive a response from the VT for heartbeat signals or probe messages, it may initiate a network initiated VT de-registration procedure. The SGW may also initiate a network initiated VT de-registration procedure due to other reasons such as lack of network resources. The AAA server may initiate a network initiated VT de-registration procedure to de-register the VT from the network access service due to, for example, accounting issues or subscription changes. An example is shown in FIG. 7.

In case of the AAA server initiates the procedure, the AAA server sends a VT de-registration request to the serving SGW of the VT, indicating the VT ID in the request (Step 701). In response, the SGW sends a VT de-registration response to the AAA server, confirming reception of the VT de-registration request (Step 702).

In case of the SGW initiates the procedure, the SGW sends a VT de-registration request to the AAA server, indicating the VT ID in the request. In response, the AAA server removes the SGW from the serving SGW registry of the VT identified by the VT ID and sends a VT de-registration response to the SGW.

The SGW then sends a VT de-registration request to the first VT address of the VT (Step 703). VT de-registration request may provide the VT with information for facilitating the VT's next registration. If the de-registration is triggered due to unreachable VT, this step is not needed.

The VT responds to the SGW with a VT de-registration response if it receives the VT de-registration request (Step 704).

The SGW sends a VT de-registration notification message to the VAN serving the VT (Step 705). The message indicates the CBID of the VT to the VAN.

The VAN responds the SGW with a VT de-registration notification response message (Step 706). Then the SGW executes a VT de-activation procedure for the VT of the CBID, which is similar to that as described in the procedure of FIG. 5.

The VT is disconnected from the VAN using a procedure similar to that as described in the procedure of FIG. 5.

Figure 8:
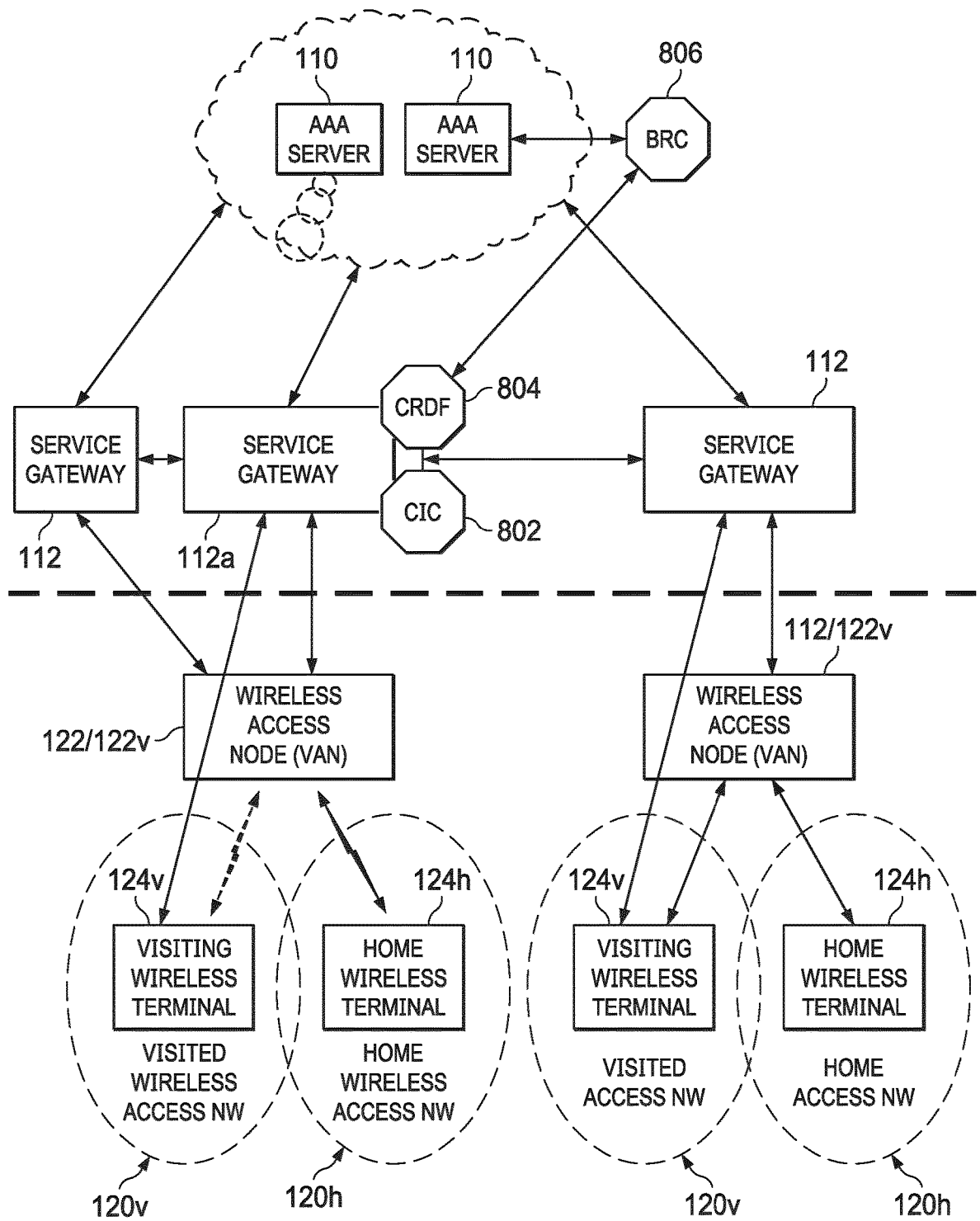
FIG. 8 illustrates an example of a network access service charging architecture.

To enable the access network contributors (i.e. VANs) to get reasonable rewards for their contribution to the network access service, a technical solution for charging/rewarding based on the network architecture of FIG. 1 is provided as illustrated in FIG. 8.

Generally speaking, a basic function for charging/rewarding in the network access service is a charging information collection.

According to this invention, all the user data traffics to/from a VT using the access network of a VAN are directed through secured communications between the VT and a SGW, with which the VT has registered. This design enables the SGW to be the focal point for collecting charging information with regard to the VT in the network access service provider's network. The charging information collected in the SGW with regard to the VT also reasonably reflects the resource consumed by the VT in the access network of the VAN and therefore can be used as a base to determine a reasonable reward for the VANs contributing to the network access service. For example, amount of data observed in the access network with regard to the VT generally equals to amount of data observed in the SGW minus management/signaling overheads, so a certain percentage of resource consumption by a VT observed in the SGW can be counted as the amount of resources contributed by the VAN associated with the VT.

Since the charging information collected by the SGW with regard to the charging ID associated with the VT can be used for both charging the VT and rewarding the VAN, according to the invention, the charging information collection (CIC) function is provided by SGWs. Each SGW comprises a charging information collection (CIC) function, which is responsible for monitoring signaling and data exchange procedures in the SGW to generate charging events, trigger the collection of charging information, identify a VT associated with the charging events, detect the network resource consumption by the VT, and so on. To enable a rewarding mechanism for the VANs contributing to the network access service, the CIC function also identifies the VAN associated with the VT or the charging events, for example, based on the serving VAN information (e.g. VAN ID) maintained in an established active VT context.

As discussed in the embodiment of FIG. 3A, an event that the SGW has successfully established an active VT context for a VT triggers the SGW to start to observe the traffics to/from the VT to monitor charging events and collect charging information with regard to the VT. The traffic can be monitored based on information such as one or more of the first/second VT address of the VT, the VT ID and/or the CBID of the VT, with regard to one or more parameters that can be used to describe the network resource consumption by the VT. The one or more parameters comprise one or more of: a registered period of the VT with the SGW, the starting time and the ending time of the registered period, the bandwidth consumed by the VT, the amount of data transmitted/received for the VT, etc. The collected charging information can be bound together using the charging ID generated for the active VT context. Especially, the charging ID should be associated with the VT ID and the VAN ID serving the VT, so that the collected charging information can be used for charging the VT as well as rewarding the VAN currently serving the VT.

Triggered by one or more predefined events, the CIC function in a SGW transfers the collected charging information with regard to a VT to a charging/rewording data formulation (CRDF) function for post processing. The events triggering the transfer include one or more of: the VT is de-registered from the SGW; the SGW deletes the VT's context in response to a message from an AAA server or another SGW, and so on.

CRDF function formulates the collected charging information into one or more charging/rewarding data records in a pre-defined format that can be used by a billing and rewarding entity. Based on the collected charging information, the CRDF function should form a first part of charging/rewarding data record that links the VT ID to be charged with an amount of network resource consumption related to the VT ID. The CRDF function should also form a second part of charging/rewarding data record that links the VAN ID that is associated with this VT ID with the amount of network resource consumption related to the VT ID. However, it should make the billing and rewarding entity to understand that this amount, when linked to the VAN ID, should be counted as a base for determining a reward to the VAN ID. The first and second parts of charging/rewording data record may be integrated in a single charging/rewarding data record, or they can be two separated charging/rewarding data records. A charging/rewarding data record may contain other information items defined by the network access service operator.

The charging/rewarding data formulation (CRDF) function may be implemented as a part of a SGW or as a separate entity external to the SGW.

The charging/rewarding data records are provided to a billing and rewarding center (BRC) for further process. The billing and rewarding center aggregates charging/rewarding data records received from SGWs on a basis of each individual subscribed user (e.g. identified by a VT ID) or each individual subscribed contributor (e.g. identified by a VAN ID). It then calculates billing or rewarding results based on the aggregated information and a pre-defined billing or rewarding policy. The BRC may communicate to AAA servers to obtain subscribed information (such as subscription category, relevant billing and rewarding policy, etc.) of VTs or VANs for billing and rewarding purpose.

Furthermore, in a case that the subscriber of a subscribed VAN also has a VT subscribed for the network access service, the AAA server may maintain information to bind the subscribed VAN account and the subscribed VT account together. This way, the rewards entered into the subscribed VAN account for contributing to the network access service can be used as credits in the subscribed VT account to pay for the bill for using the network access service. The network access service provider may further define different billing/rewarding features based on the charging/rewarding functions according to the invention.

Figure 9:
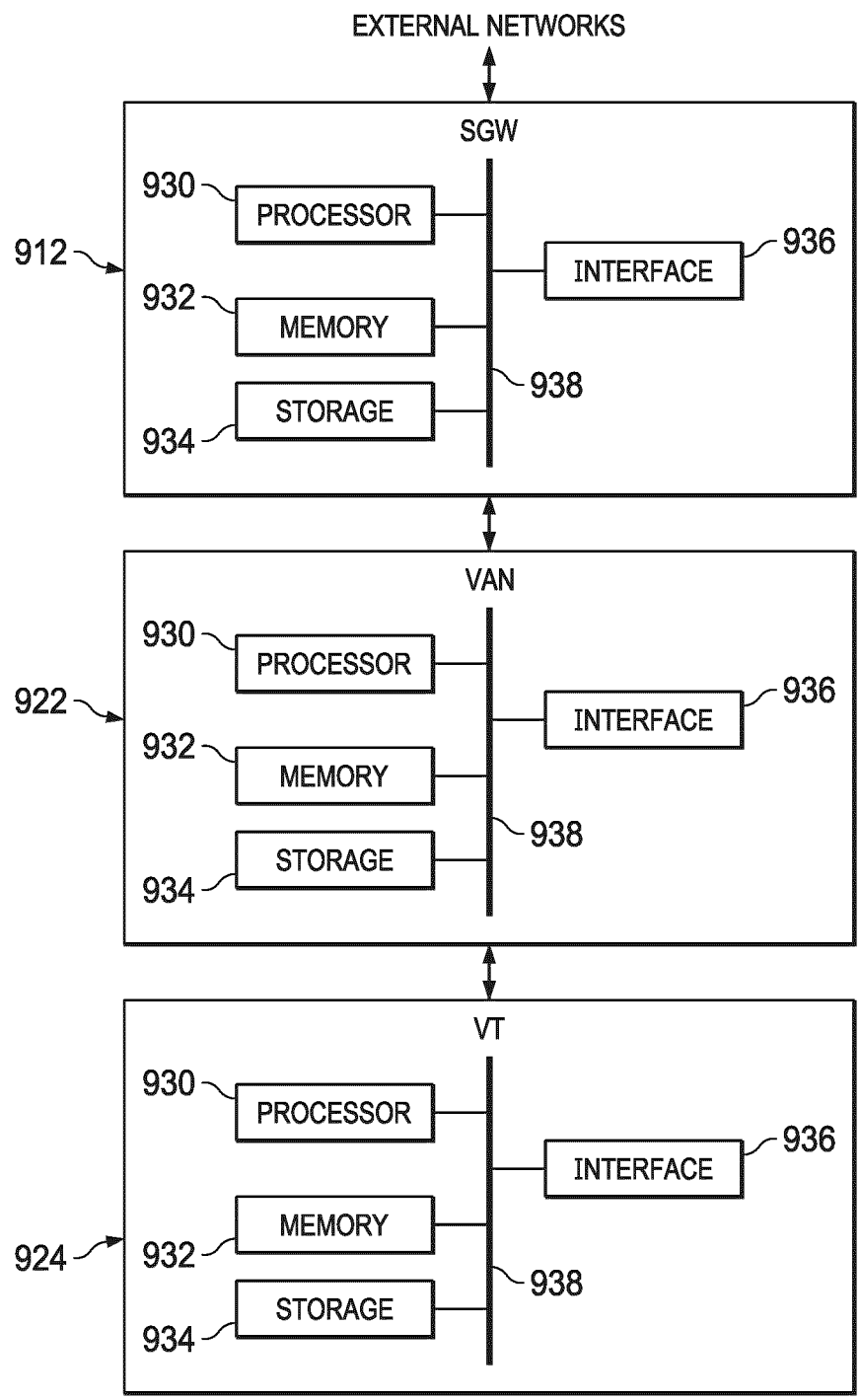
FIG. 9 illustrates an exemplary network of a network access service.

FIG. 9 depicts an example of a network access service including an example visiting station (VT), an example visited access node (VAN) and an example service gateway (SGW). The VT can perform functionality described with respect to the VT of FIG. 1. In like fashion, the VAN can perform functionality described with respect to the VAN of FIG. 1 and the SGW can perform functionality described with respect to the SGW of FIG. 1.

VT, VAN, and SGW may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of VT, VAN, and SGW may comprise any suitable physical form, configuration, number, type and/or layout. As an example, and not by way of limitation, VT, VAN, and SGW may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, VT, VAN, and SGW may include one or more computer systems; be unitary or distributed; span multiple locations; span multiple machines; or reside in a cloud, which may include one or more cloud components in one or more networks.

In the depicted embodiment, VT, VAN, and SGW each include their own respective processors; memory; storage; interfaces; and buses. For simplicity, similar components of VT, VAN, and SGW will be discussed together while referring to the component of VT. However, it is not necessary for these devices to have the same components, or the same type of components. For example, the processor of VT may be a general purpose microprocessor and processor of SGW may be an application specific integrated circuit (ASIC).

In each of VT, VAN, and SGW, the processor may be a microprocessor, controller, or any other suitable computing device, resource, or combination of hardware, software and/or encoded logic operable to provide, either alone or in conjunction with other components, (e.g., memory) wireless and/or wireline networking functionality. Such functionality may include providing various features discussed herein. In particular embodiments, the processor may include hardware for executing instructions, such as those making up a computer program. As an example and not by way of limitation, to execute instructions, the processor may retrieve (or fetch) instructions from an internal register, an internal cache, memory, or storage; decode and execute them; and then write one or more results to an internal register, an internal cache, memory, or storage.

In particular embodiments, the processor may include one or more internal caches for data, instructions, or addresses. This disclosure contemplates a processor including any suitable number of any suitable internal caches, where appropriate. As an example and not by way of limitation, the processor may include one or more instruction caches, one or more data caches, and one or more translation lookaside buffers (TLBs). Instructions in the instruction caches may be copies of instructions in memory or storage and the instruction caches may speed up retrieval of those instructions by the processor. Data in the data caches may be copies of data in memory or storage for instructions executed at the processor; the results of previous instructions executed at the processor for access by subsequent instructions executing at the processor, or for writing to memory, or storage; or other suitable data. The data caches may speed up read or write operations by the processor. The TLBs may speed up virtual-address translations for the processor. In particular embodiments, the processor may include one or more internal registers for data, instructions, or addresses. Depending on the embodiment, the processor may include any suitable number of any suitable internal registers, where appropriate. Where appropriate, the processor may include one or more arithmetic logic units (ALUs), or be configured a multi-core processor; or may include one or more processors; or may be arranged according to any other suitable processor architecture or implementation.

Memory may be any form of volatile or non-volatile memory including, without limitation, magnetic media, optical media, random access memory (RAM), read-only memory (ROM), flash memory, removable media, or any other suitable local or remote memory component or components. In particular embodiments, memory may include volatile or non-volatile random access memory (RAM), such as dynamic RAM (DRAM) or static RAM (SRAM). Moreover, where appropriate, this RAM may be single-ported or multi-ported RAM, or any other suitable type of RAM or memory. Memory may include one or more memories, where appropriate. Memory may store any suitable data or information utilized by VT, including software embedded in a computer readable medium, and/or encoded logic incorporated in hardware or otherwise stored (e.g., firmware). In particular embodiments, memory may include main memory for storing instructions for processor to execute or data for processor to operate on. In particular embodiments, one or more memory management units (MMUs) may reside between processor and memory and facilitate accesses to memory as requested by the processor.

As an example and not by way of limitation, VT may load instructions from storage or another source (such as, for example, another computer system) to memory. The processor may then load the instructions from memory to an internal register or internal cache. To execute the instructions, the processor may retrieve the instructions from the internal register or internal cache and decode them. During or after execution of the instructions, the processor may write one or more results (which may be intermediate or final results) to the internal register or internal cache. The processor may then write one or more of those results to memory. In particular embodiments, the processor may execute only instructions in one or more internal registers or internal caches or in memory (as opposed to storage or elsewhere) and may operate only on data in one or more internal registers or internal caches or in memory (as opposed to storage or elsewhere).

In particular embodiments, storage may include mass storage for data or instructions. As an example and not by way of limitation, storage may include a hard disk drive (HDD), a floppy disk drive, flash memory, an optical disc, a magneto-optical disc, magnetic tape, or a Universal Serial Bus (USB) drive or a combination of two or more of these. Storage may include removable or non-removable (or fixed) media, where appropriate. Storage may be internal or external to VT, where appropriate. In particular embodiments, storage may be non-volatile, solid-state memory. In particular embodiments, storage may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage may take any suitable physical form and may comprise any suitable number or type of storage. Storage may include one or more storage control units facilitating communication between the processor and storage, where appropriate.

In particular embodiments, interface may include hardware, encoded software, or both providing one or more interfaces for communication (such as, for example, packet-based communication) among VT, VAN, SGW, any networks, any network devices, and/or any other computer systems. As an example and not by way of limitation, interface may include a network interface controller (NIC) or network adapter for communicating with an Ethernet or other wire-based network and/or a wireless NIC (WNIC) or wireless adapter for communicating with a wireless network.

In some embodiments, interface comprises one or more radios coupled to one or more physical antenna ports. Depending on the embodiment, interface may be any type of interface suitable for any type of network for which wireless network is used. As an example and not by way of limitation, interface can include an interface of a wireless PAN (WPAN) (such as, for example, a BLUETOOTH WPAN), a Wi-Fi network, a Wi-MAX network, an LTE network, an LTE-A network, a cellular telephone network (such as, for example, a Global System for Mobile Communications (GSM) network), or any other suitable wireless network or a combination of two or more interfaces of these. VT may include any suitable interface for any one or more of these networks, where appropriate.

In some embodiments, interface may include one or more interfaces for one or more I/O devices. One or more of these I/O devices may enable communication between a person and VT. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces for them. Where appropriate, interface may include one or more drivers enabling the processor to drive one or more of these I/O devices. Interface may include one or more interfaces, where appropriate.

Bus may include any combination of hardware, software embedded in a computer readable medium, and/or encoded logic incorporated in hardware or otherwise stored (e.g., firmware) to couple components of VT to each other. As an example and not by way of limitation, bus may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus may include any number, type, and/or configuration of buses, where appropriate. In particular embodiments, one or more buses (which may each include an address bus and a data bus) may couple the processor to memory. Bus may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the processor (such as, for example, one or more internal registers or caches), one or more portions of memory, one or more portions of storage, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

What is claimed is:

1. A method used by a terminal to communicate data over a network in a case that the terminal does not connect to its home access network and the network has a fixed account with associated security credentials maintained in a AAA server of a network access service provider associated with a service gateway for participating in a network access service, the method comprising:
   selecting an access node as a visiting access node or the network access service;
   establishing a connection with the access node which has a fixed address and has a service set identifier (SSID) specific for the network access service;
   obtaining a first terminal address from the access node;
   receiving an address/identity of a service gateway and a binding identity from the access node, the binding identity is transmitted from the access node to the terminal and assigned by either the access node or the service gateway to establish a context association between the terminal and the access node per the service gateway for uniquely identifying the terminal in the service gateway before performing the authentication and authorization procedure with the AAA server to authenticate the terminal with the network by the AAA server;
   establishing a connection for communications with the service gateway via the access node using the first terminal address with which the access node has registered to communicate with the service gateway and the address/identity of the service gateway before performing the authentication and authorization procedure with the AAA server to authenticate the terminal with the network by the AAA server;
   sending a registration request over the connection with the service gateway, providing the binding identity to the service gateway and registering an identity of the terminal in association with the binding identity at the service gateway before performing the authentication and authorization procedure with the AAA server to authenticate the terminal with the network by the AAA server; and
   perform an authentication and authorization procedure with the AAA server after sending the registration request over the connection with the service gateway, providing the binding identity to the service gateway and registering the identity of the terminal in association with the binding identity at the service gateway;
   then communicating data traffic with the service gateway via the access node, wherein the AAA servers is located in a core network portion of the network to authenticate the terminal to access the core network.

2. The method of claim 1, further comprising:
   prior to establishing a connection with the access node, receiving, from the access node, a signal from the access node indicating availability of a network access service from a network access service provider associated with the service gateway.

3. The method of claim 1, further comprising:
   upon registering the identity of the terminal at the service gateway, receiving a second terminal address from the service gateway;
   wherein the step of communicating data traffic comprises:
   communicating data traffic with an external network via the service gateway and the access node using the second terminal address.

4. A method used by a terminal to communicate data over a network in a case that the terminal does not connect to its home access network and the network has a fixed account with associated security credentials maintained in a AAA server of a network access service provider associated with a service gateway for participating in a network access service, the method comprising:
   selecting an access node as a visiting access node or the network access service;
   establishing a connection with an access node;
   obtaining a first terminal address from the access node;
   receiving from the access node a registration initiation request message which comprises an address/identity of a service gateway before performing the authentication and authorization procedure with the AAA server to authenticate the terminal with the network by the AAA server;
   establishing a connection for communications with the service gateway via the access node using the first terminal address with which the access node has registered to communicate with the service gateway and the address/identity of the service gateway before performing the authentication and authorization procedure with the AAA server to authenticate the terminal with the network by the AAA server;

sending a registration request to the service gateway using the established connection, the registration request uniquely identifying the terminal in the service gateway and also comprising an address or an SSID of the access node which has a fixed address and the SSID is specific for the network access service before performing the authentication and authorization procedure with the AAA server to authenticate the terminal with the network by the AAA server;

perform an authentication and authorization procedure with the AAA server after sending the registration request to the service gateway using the established connection;

receiving a context association notification from the service gateway via the access node; and then communicating data traffic with the service gateway via the access node wherein the AAA servers is located in a core network portion of the network to authenticate the terminal to access the core network.

5. The method of claim 1, wherein the method of claim 1 is performed by a mobile terminal.

6. The method of claim 4, further comprising:
prior to establishing a connection with the access node, receiving, from the access node, a signal from the access node indicating availability of a network access service from a network access service provider associated with the service gateway.

7. The method of claim 4, wherein the step of establishing a connection establishes secured communications with the service gateway via the access node;
and further comprising:
executing an authentication procedure over the secured communications connection for data communications via the access node and the service gateway.

8. The method of claim 4, wherein the method of claim 4 is performed by a mobile terminal.

9. A method used by an access node to communicate data between a terminal and a network in a case that the terminal does not connect to its home access network and the network has a fixed account with associated security credentials maintained in a AAA server of a network access service provider associated with a service gateway for participating in a network access service, and the access node has a fixed address and a SSID specific for the network access service, the method comprising:

establishing a connection with a terminal, and before establishing the connection with the terminal, registering the access node with the service gateway before performing the authentication and authorization procedure with the AAA server to authenticate the terminal with the network by the AAA server;

assigning a first terminal address to the terminal;

sending a terminal context association request to a service gateway before performing the authentication and authorization procedure with the AAA server to authenticate the terminal with the network by the AAA server;

responsive to receiving an acceptance of the terminal context association request from the service gateway, sending a binding identity and an address/identity of the service gateway to the terminal before performing the authentication and authorization procedure with the AAA server to authenticate the terminal with the network by the AAA server, wherein the binding identity is transmitted from the access node to the terminal and assigned by either the access node or the service gateway to establish a context association between the terminal and the access node per the service gateway; and facilitating an authentication and authorization procedure between the terminal and the AAA server after receiving the acceptance of the terminal context association request from the service gateway;

then forwarding data traffic between the terminal and the service gateway, wherein the access node is configured to so that all traffic of user data to/from the terminal are received and transmitted to the service gateway with which the access node is registered, wherein the AAA servers is located in a core network portion of the network to authenticate the terminal to access the core network.

10. The method of claim 9, further comprising:
assigning a binding identity uniquely identifying the associated terminal in the service gateway, the binding identity comprising a part specific to the associated terminal comprising one or more of the first terminal address and a MAC address of the terminal;
wherein the terminal context association request comprises the binding identity.

11. The method of claim 9, further comprising:
forwarding signals between the terminal and the service gateway to establish secured communications between the terminal and the service gateway.

12. The method of claim 9, further comprising:
receiving a confirmation message from the service gateway indicating association of the access node with the binding identity of the terminal in response to registration of the terminal with the service gateway; and
then monitoring data traffic communicated between the terminal and the service gateway via the access node.

13. The method of claim 12, wherein the monitoring step allows data traffic between the terminal as identified by an address of the terminal and a address and/or port of the service gateway with which the terminal is registered, and blocks data traffic associated with another terminal address or with another port of the service gateway.

14. The method of claim 9, further comprising:
prior to establishing a connection with the terminal, transmitting a signal indicating availability of a network access service from a network access service provider associated with the service gateway.

15. The method of claim 9, further comprising:
responsive to receiving acceptance of the terminal context association request from the service gateway, the acceptance comprising an address of a second service gateway different from the service gateway, sending the binding identity and an address/identity of the second service gateway to the terminal.

16. The method of claim 15, further comprising:
before establishing the connection with the terminal, registering the access node with the service gateway; and
responsive to receiving acceptance of the terminal context association request comprising the address of the second service gateway, registering the access node with the second service gateway.

17. The method of claim 9, wherein the acceptance of the terminal context association request comprises a binding identity for the terminal assigned by the service gateway responsive to the terminal context association request sent to the service gateway, the binding identity uniquely identifying the associated terminal in the service gateway.

18. The method of claim 9, wherein the method of claim 9 is performed by an access node.

* * * * *